United States Patent
Seto et al.

(10) Patent No.: US 8,567,279 B2
(45) Date of Patent: Oct. 29, 2013

(54) MECHANISM FOR CONVERTING ROTARY MOTION INTO LINEAR MOTION

(75) Inventors: Shinji Seto, Hitachinaka (JP); Isamu Tsubono, Ushiku (JP); Kenji Hiraku, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 12/893,417

(22) Filed: Sep. 29, 2010

(65) Prior Publication Data

US 2011/0072928 A1   Mar. 31, 2011

(30) Foreign Application Priority Data

Sep. 30, 2009   (JP) .................................. 2009-225894

(51) Int. Cl.
*F16H 1/24* (2006.01)
*F16H 55/02* (2006.01)

(52) U.S. Cl.
USPC ..................................... 74/424.91; 74/424.92

(58) Field of Classification Search
USPC ........... 74/424.91, 424.92; 384/44, 45, 47, 51
See application file for complete search history.

(56) References Cited

U.S. PATENT DOCUMENTS

| | | | |
|---|---|---|---|
| 3,101,623 A | | 8/1963 | Hayes |
| 4,964,314 A * | | 10/1990 | Wilkes ........................ 74/424.92 |
| 6,684,728 B2 * | | 2/2004 | Higuchi et al. ............. 74/424.91 |
| 7,044,012 B2 * | | 5/2006 | Dubus et al. .................. 74/89.35 |
| 7,044,017 B2 * | | 5/2006 | Cornelius et al. ........... 74/424.88 |
| 7,643,778 B2 * | | 1/2010 | Brown et al. ................... 399/272 |
| 8,011,264 B2 * | | 9/2011 | Tsubono et al. ............ 74/424.91 |
| 2011/0072928 A1 * | | 3/2011 | Seto et al. ................... 74/424.92 |

FOREIGN PATENT DOCUMENTS

| JP | 51-126885 U | 10/1976 |
|---|---|---|
| JP | 2006-329258 A | 12/2006 |
| JP | 2006329258 A * | 12/2006 |

OTHER PUBLICATIONS

Japanese Office Action with English translation dated Oct. 18, 2011 (four (4) pages).

* cited by examiner

*Primary Examiner* — Troy Chambers
*Assistant Examiner* — Alexander Vu
(74) *Attorney, Agent, or Firm* — Crowell & Moring LLP

(57) ABSTRACT

A mechanism for converting rotary motion into linear motion includes a rod having a thread or threaded part at its outer peripheral surface, and a holder member on the outer peripheral surface of the rod, rotatable relative to the rod, and axially movable relative to the rod. Rollers are supported rotatably by the holder member and have annular grooves at their outer peripheral surfaces. Each roller is torsionally disposed at an axial angle greater than or equal to a lead angle of the thread with respect to a central axis of the rod. Both ends of the roller shaft are secured to the holder member, and the mechanism has a structure in which a hole having a diameter greater than that of the roller shaft is provided at one end of the holder member and the roller shaft is secured by a roller mounting member.

5 Claims, 6 Drawing Sheets

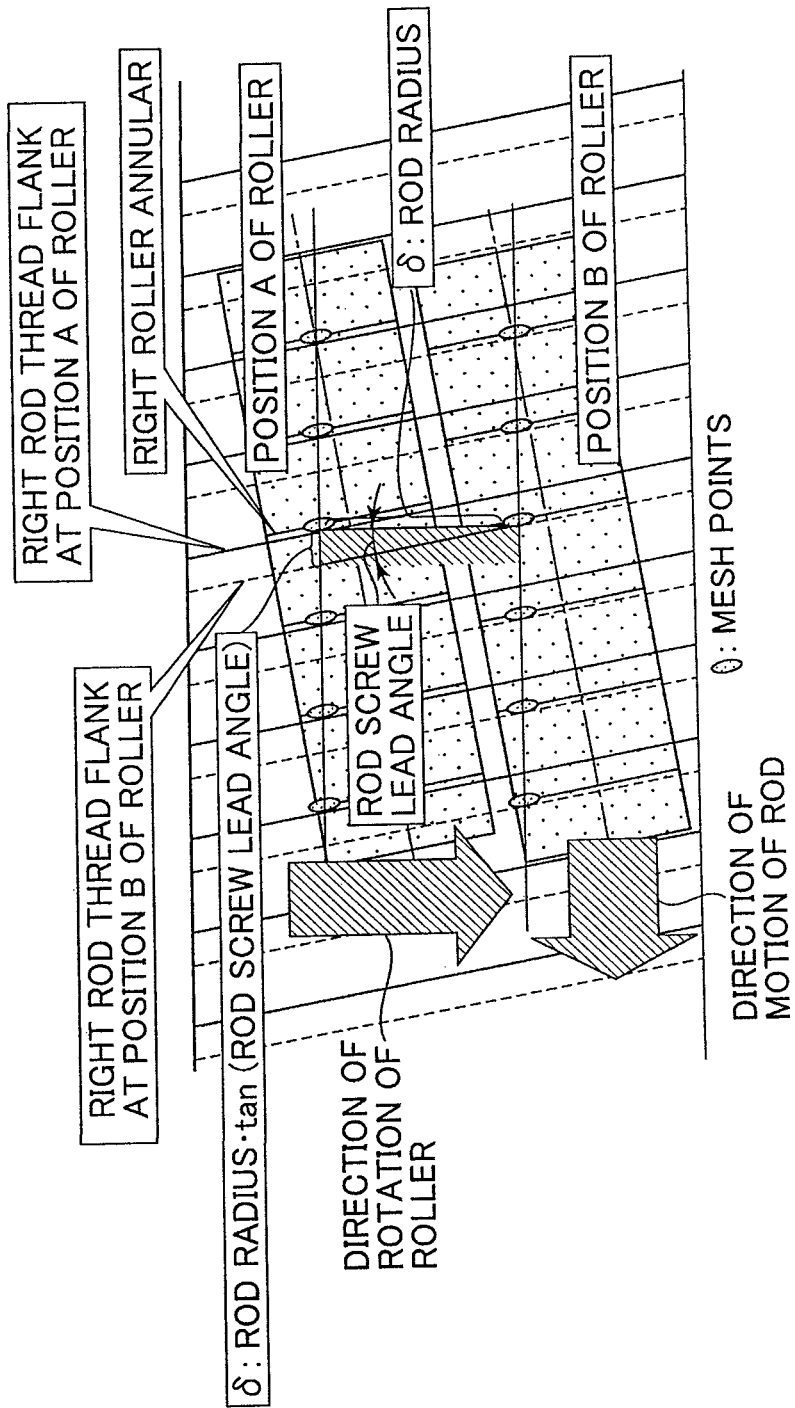

MECHANISM FOR CONVERTING ROTARY MOTION INTO LINEAR MOTION

BACKGROUND OF THE INVENTION

1. Field of the Invention

The present invention relates to a rotary-to-linear motion conversion mechanism for converting the direction of motion between rotary motion and linear motion.

2. Description of the Related Art

As a rotary-to-linear motion conversion mechanism, there has been known one wherein a rod having a thread at its outer peripheral surface, a holder member provided on the outer peripheral surface of the rod and provided so as to be rotatable relative to the rod and axially movable relative thereto, and a plurality of rollers supported rotatably by the holder member and having annular grooves which mesh with the thread of the rod at their outer peripheral surfaces, are disposed aslant with respect to the central axis of a holder, and the rotation of each roller is converted into linear motion of the rod by meshing engagement therebetween.

The rotary-to-linear motion conversion mechanism is, however, accompanied by problems that upon assembly thereof, since the rollers are different from one another in the tilt direction with respect to the holder, a difficulty occurs in fixing one end sides thereof to the holder and thereafter making fixation for the other end sides. On the other hand, there has been proposed a method such as turning only the ends of the rollers into tilt-free forms (refer to U.S. Pat. No. 3,101,623).

SUMMARY OF THE INVENTION

The above system was accompanied by the problems that it became complicated in shape and high in cost. An object of the present invention is therefore to provide a rotary-to-linear motion mechanism which enables an easiable-to-assemble structure at a low cost.

In order to achieve the above object, the present invention provides a mechanism for converting rotary motion into linear motion, comprising: a rod having a thread at an outer peripheral surface thereof; a holder member provided on the outer peripheral surface of the rod, and provided so as to be rotatable relative to the rod and axially movable relative thereto; and rollers supported rotatably by the holder member and having annular grooves brought into meshing engagement with the thread of the rod at outer peripheral surfaces thereof, and each torsionally disposed at an axial angle in the neighborhood of a lead angle of the thread with respect to the central axis of the rod, wherein each of the roller comprises a hollow roller annular groove section and a roller shaft disposed in a hollow portion of the roller so as to be rotatable relative to the annular groove section, wherein the roller shaft has a structure in which both ends thereof are secured to the holder member, wherein a hole having a diameter greater than that of the roller shaft at its end face is provided at one end of the holder member, and wherein the roller shaft is secured by a roller mounting member.

According to the present invention, there can be provided a rotary-to-linear motion conversion mechanism which is easy to assemble and is low in cost.

BRIEF DESCRIPTION OF THE DRAWINGS

FIG. 8 is a view for explaining the operation of the mechanism according to the embodiment of the present invention.

DESCRIPTION OF THE PREFERRED EMBODIMENTS

A first embodiment of a mechanism for converting rotary motion into linear motion according to the present invention will be explained using FIGS. 1 through 8.

Figure 1:
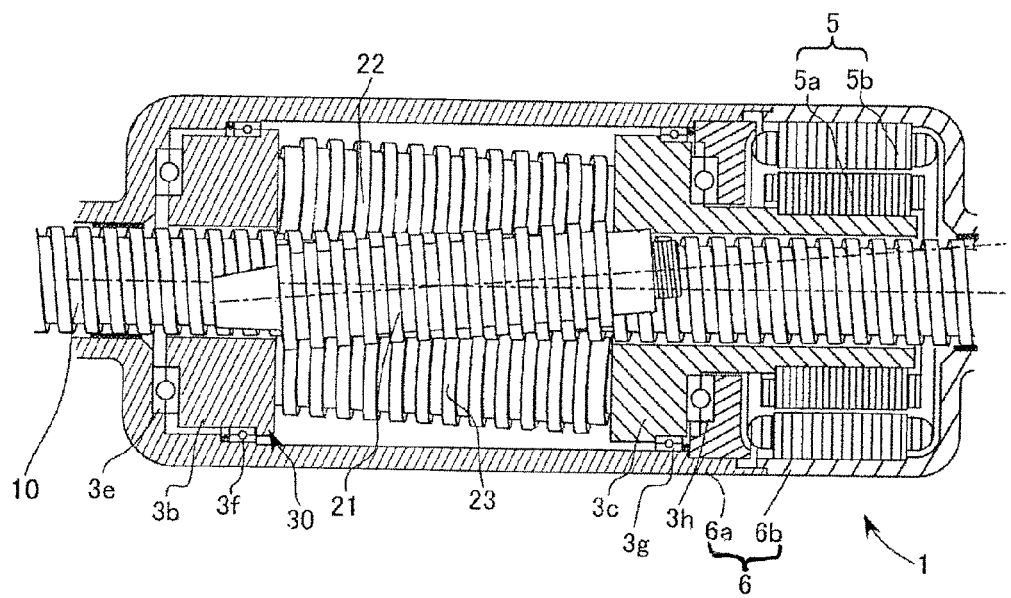
FIG. 1 is a longitudinal cross-sectional view of a mechanism for converting rotary motion into linear motion, according to an embodiment of the present invention.
Figure 2:
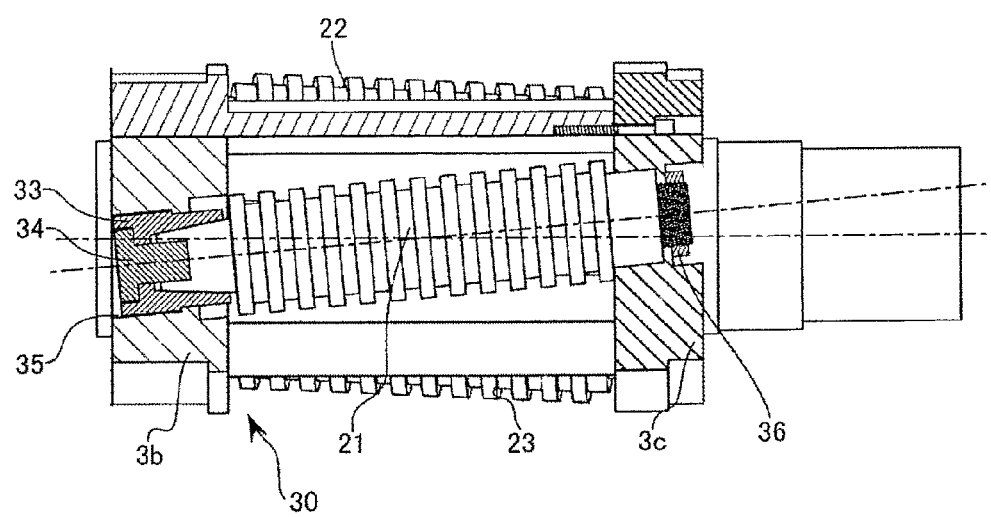
FIG. 2 is a side view of a sub-assembly of rollers and a holder member, which is employed in the embodiment of the present invention and is a view partly showing cross-sections thereof.
Figure 3:
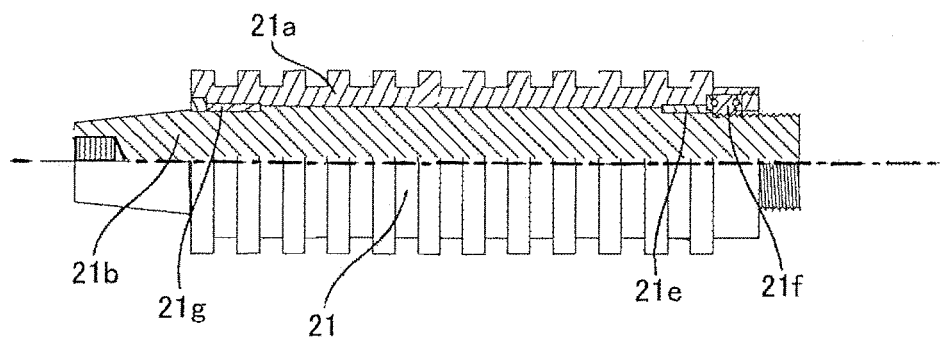
FIG. 3 is a side view of the roller employed in the embodiment of the present invention and is a view partly showing cross-sections thereof.

FIG. 1 is a longitudinal cross-sectional view of the first embodiment of the present invention, FIG. 2 is a side view of a sub-assembly of rollers and a holder member, FIG. 3 is a side view of the roller, FIGS. 4 through 7 are respectively enlarged views of a portion for mounting the roller and its corresponding holder, and FIG. 8 is a view for explaining the operation of the rotary-to-linear motion conversion mechanism according to the present embodiment.

A configuration of the rotary-to-linear motion conversion mechanism according to the present embodiment will first be explained. As shown in FIG. 1, the present rotary-to-linear motion conversion mechanism 1 is comprised principally of a motor 5, a casing 6 consisting of a left casing 6a and a right casing 6b, a plurality of rollers 21 through 23, a rod 10, etc. The rollers 21 through 23 rotate relative to the casing by force produced by the motor 5, and the rod is linearly moved by meshing engagement of annular grooves respectively provided at the rollers 21 through 23 with a thread or threaded part of the rod 10.

A concrete configuration of the rotary-to-linear motion conversion mechanism will next be described. The sub-assembly 30 comprised of the rollers 21 through 23 and a holder member 3 has a left holder end plate 3b which is inserted into the left casing 6a equipped with a left holder radial bearing 3f and a left holder thrust bearing 3e and is fixed or secured in a state of being rotatable relative to the left casing 6a. Similarly, a right holder radial bearing 3g and a right holder thrust bearing 3h are inserted into the right casing 6b. The sub-assembly 30 is mounted in a state of being rotatable relative to the right casing 6b. The left and right casings are connected by screws and the like to form the casing 6.

Further, a stator 5b is press-fitted into the right casing 6b. In the holder member 3, a rotor 5a is placed in a position opposite to the stator 5b, and the motor 5 is formed by the stator 5b and the rotor 5a.

The sub-assembly 30 comprised of the rollers 21 through 23 and the holder member 3 will next be explained using FIGS. 2 and 3. Incidentally, the rollers 21 through 23 are similar in configuration to the roller 21. The roller 21 will therefore be described below. The roller 21 comprises a roller annular portion or section 21a having a through hole at its central axis portion and annular grooves at its outer peripheral surface, and a roller shaft 21b disposed in the through hole and disposed fixedly to the holder member 3. A radial bearing 21e and a thrust bearing 21f are disposed on the right side of the roller annular portion 21a. The roller annular portion 21a is rotatably connected to the roller shaft 21b. A right holder end plate 3c is secured to the right side of the roller shaft 21b by a roller lock nut 36. At this time, the roller 21 is placed aslant with respect to the central axis of the holder member 3 at an axial angle in the neighborhood of the twisted angle of the rod 10.

Thus, the roller annular portion 21a is rotatably secured to the holder member 3. A through hole 35 having a diameter appropriately larger than that of the roller shaft 21b at its end face is provided parallel to the roller shaft 21b in such a manner that the roller shaft 21b can be inserted into the left holder end plate 3b. Then, the left roller radial bearing 21g is fitted in the through hole 35 and thereafter fills in the through hole 35. A roller mounting member 33 inserted into the left side of the roller shaft 21b and secured to the left holder member 3b is embedded in the through hole 35. Further, the left holder member 3b and the roller shaft 21b are fixedly disposed by a bolt 34 and the like.

Such an assembly method makes it easy to allow the rollers 21 through 23 inclined in different directions relative to the right holder end plate 3c to pass through the left holder end plate 3b.

At this time, the left side of the roller shaft 21b may preferably be shaped in the form of a taper in such a manner that the diameter of its leftmost end becomes small.

By doing so, the diameter of the through hole 35 can be made small, thus making it possible to reduce the entire holder in size. Since it is possible to make the diameter of the through hole small, the strength of the holder can also be enhanced.

Figure 4:
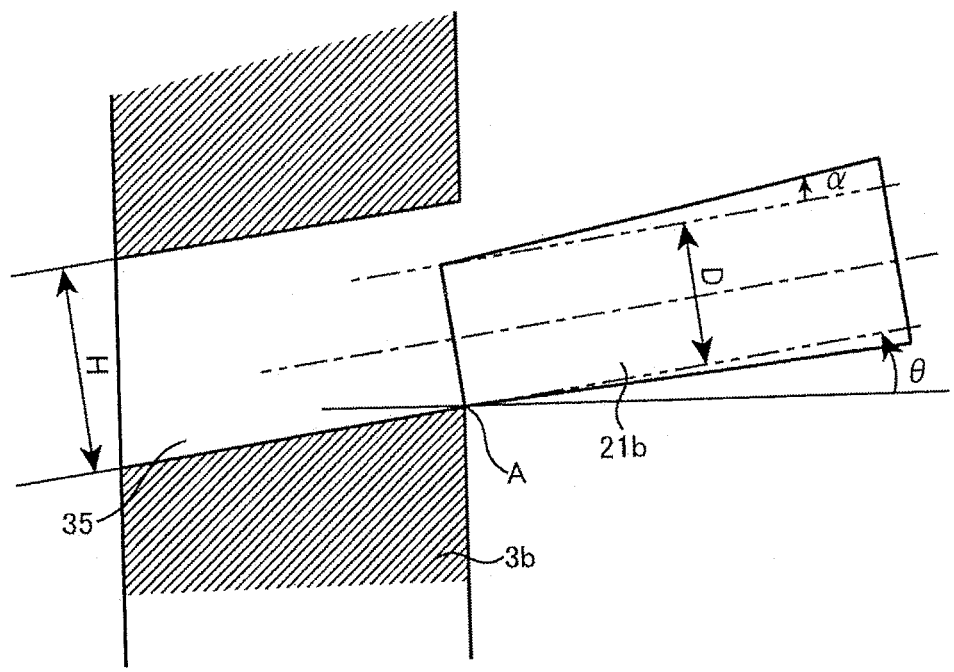
FIG. 4 is a view showing one end of the roller and a mounting portion of a holder both employed in the embodiment of the present invention.
Figure 5:
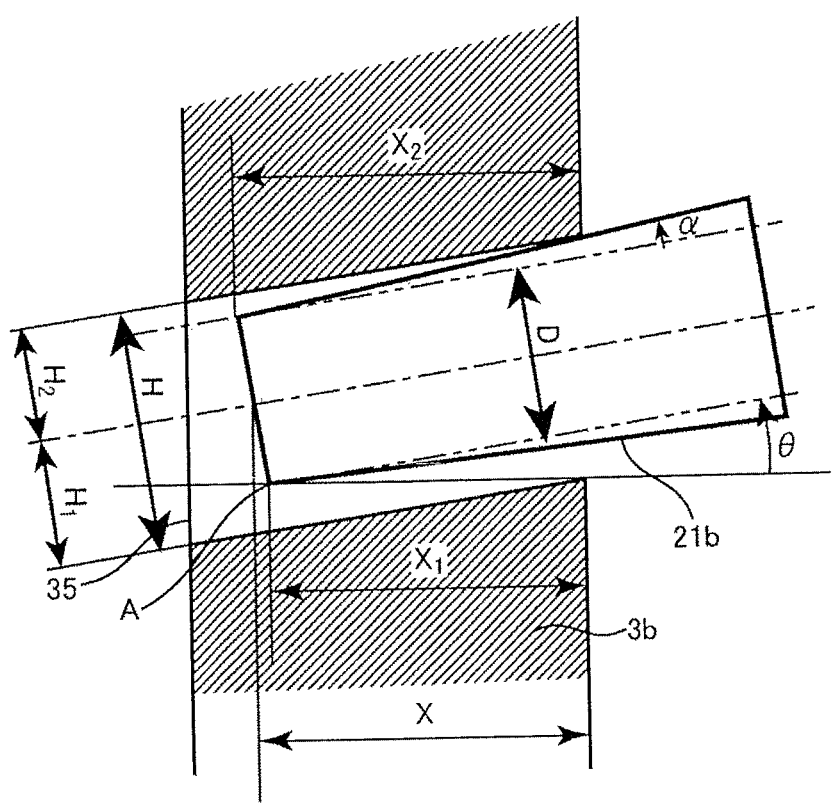
FIG. 5 is a view illustrating one end of the roller and the mounting portion of the holder both employed in the embodiment of the present invention.
Figure 6:
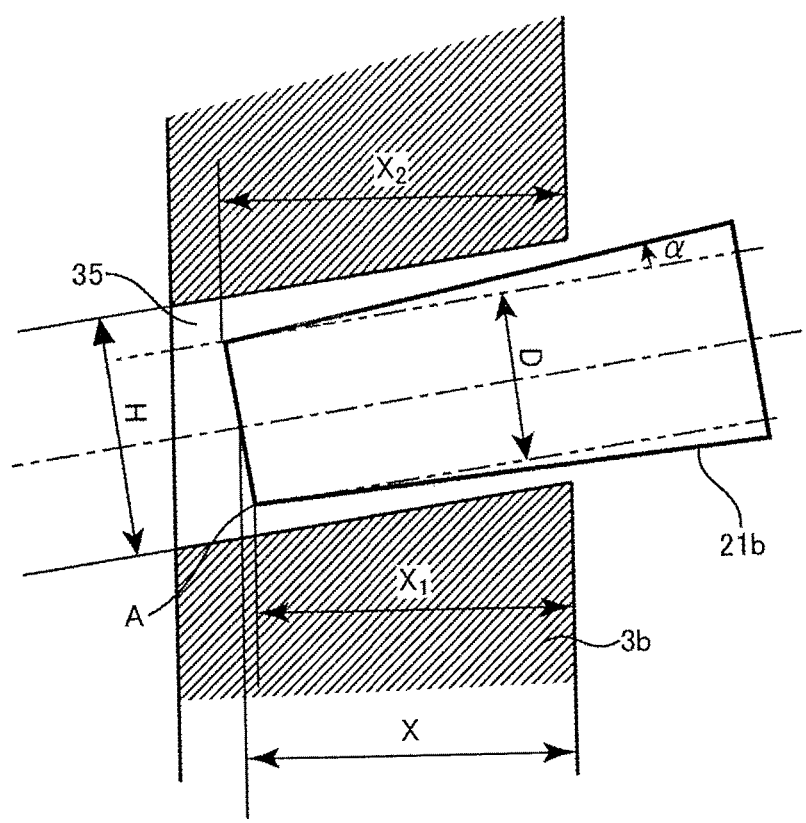
FIG. 6 is a view showing one end of the roller and the mounting portion of the holder both employed in the embodiment of the present invention.

FIGS. 4 through 6 respectively show procedures for insertion of the roller shaft 21b into the left holder end plate 3b and necessary diameters. As shown in FIG. 4, the axial angle is assumed to be $\theta$, the angle which the roller shaft forms with the central axis of the taper provided at one end side of the roller shaft 21b is assumed to be $\alpha$, and the diameter of the roller shaft 21b at its end face is assumed to be D.

Consideration will first be given to the case where $\theta \geq \alpha$. Consider where the right side of the roller shaft 21b as seen in each figure is inclined upward. The through hole is assumed to be provided parallel to the roller shaft 21b. When a lower point as viewed in the drawing is assumed to be A at the left end face of the roller shaft 21b as shown in FIG. 4, the roller shaft 21b is inserted in such a manner that the point A overlaps with the right lowermost part of the through hole. Next, as shown in FIG. 5, the central axis of the roller shaft 21b is inserted into the left holder end plate 3b by a depth X of insertion therein. At this time, the diameter H of the through hole may be determined to such a size that the upper end of the roller shaft 21b and a point B of the through hole come into contact with each other. Thereafter, as shown in FIG. 6, the left holder end plate 3b is rotated in such a manner that the central axis of the roller shaft 21b and the central axis of the through hole 35 coincide with each other.

The size of H will now be explained.

Consider the through hole 35 whose upper and lower sides are separated into H2 and H1 with the central axis of the roller shaft 21b taken as the boundary in a state of FIG. 5.

At this time, H1 is expressed in the following equation:

$$H1=(D/2)+X1\times\sin(\theta) \qquad (1)$$

where X1 denotes the depth of insertion of the left lower end of the roller shaft 21b into the left holder end plate 3b.

Also H2 is expressed in the following equation:

$$H2=(D/2)+X2\times\sin(\alpha)/\cos(\theta+\alpha) \qquad (2)$$

where X2 indicates the depth of insertion of the left upper end of the roller shaft 21b into the left holder end plate 3b.

Since X1 and X2 are represented by the following equations:

$$X1=X-D\times\sin(\theta)/2 \qquad (3)$$

$$X2=X+D\times\sin(\theta)/2 \qquad (4),$$

H (=H1+H2) is as follows:

$$H=D+(X-D/2\times\sin(\theta))\times\sin(\theta)+(X+D/2\times\sin(\theta))\times\sin(\alpha)/\cos(\theta+\alpha) \qquad (5)$$

Next, consider where $\theta<\alpha$.

Figure 7:
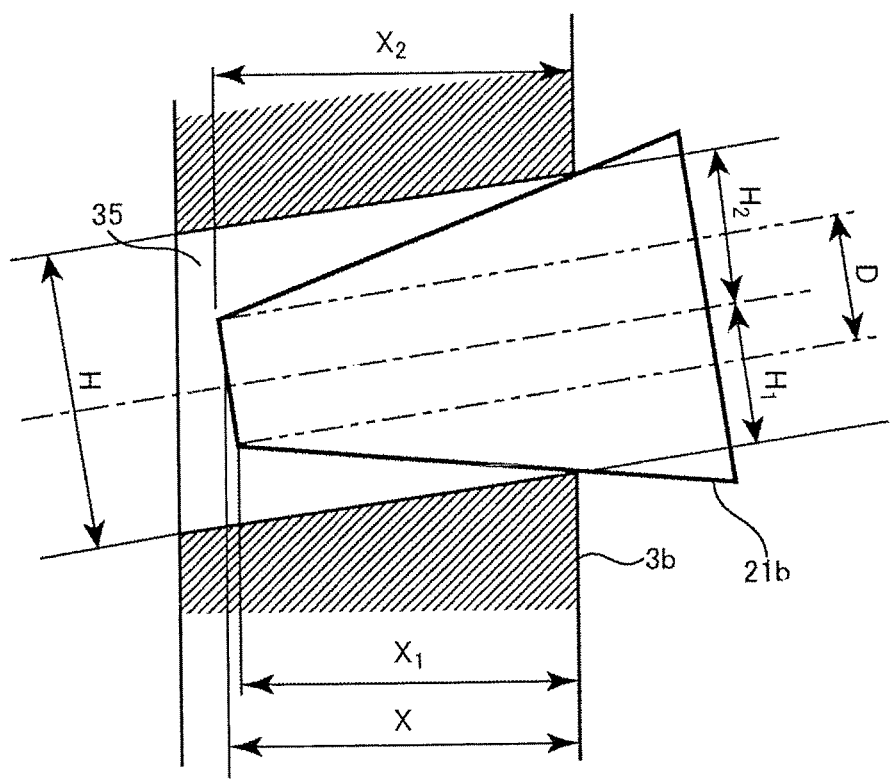
FIG. 7 is a view depicting one end of the roller and the mounting portion of the holder both employed in the embodiment of the present invention.

Consider the through hole 35 whose upper and lower sides are separated into H2 and H1 with the central axis of the roller shaft 21b taken as the boundary in a state of FIG. 7 as in FIG. 5.

At this time, H1 is expressed in the following equation:

$$H1=(D/2)+X1\times\sin(\alpha)/\cos(\alpha-\theta) \qquad (6)$$

where X1 denotes the depth of insertion of the lower end of the roller shaft 21b at its left end face into the left holder end plate 3b.

H2 is expressed in the following equation:

$$H2=(D/2)+X2\times\sin(\alpha)/\cos(\theta+\alpha) \qquad (7)$$

where X2 indicates the depth of insertion of the upper end of the roller shaft 21b at its left end face into the left holder end plate 3b.

Since X1 and X2 are represented by the following equations:

$$X1=X-D\times\sin(\theta)/2 \qquad (8)$$

$$X2=X+D\times\sin(\theta)/2 \qquad (9),$$

H (=H1+H2) is as follows:

$$H=D+(X-D\times\sin(\theta)/2)\times\sin(\alpha)/\cos(\alpha-\theta)+(X+D/2\times\sin(\theta))\times\sin(\alpha)/\cos(\theta+\alpha) \qquad (10)$$

It is thus possible to minimize the diameter of the through hole 35.

Finally, the roller shaft 21b is secured by its corresponding roller mounting member 33. Although the hole extending through the left holder end plate 3b is taken as the through hole, it is not necessarily required to penetrate the left holder end plate 3b. Alternatively, the hole may be provided as a penetration-free insertion hole. When the hole is taken as the through hole, the mounting member can be brought to a structure that it can be inserted from the non-roller annular groove section side of the through hole, thus resulting in easy assembly.

The operation of the present embodiment will next be explained using FIG. 8. FIG. 8 is a view showing the outer peripheral surface of the rod 10 in a developed form in order to explain the principle of its operation. Now consider where the motor is limited to the rotation thereof down from above in FIG. 8. The holder member 3 is rotated about the axis of the rod 10 and the three rollers held by the holder member 3 also perform the same rotation as the motor. Thus, the roller is moved vertically from above (position A) to below (position B) in FIG. 8. A heavy line shown in FIG. 8 indicates a right rod thread flank where the roller is placed in the position A. Consider where the roller is rotated by δ radians (rad) from the position A and moved by δ· (radius of rod shaft) on the circumference of the rod 10 to reach the position B.

At this time, the position of the face of each right roller annular groove is not moved in the direction of the rod shaft but moved only in the vertical direction on the developed view. Thus, when the rod is moved in its axial direction (horizontal direction on the developed view) by δ· (radius of rod shaft) tan(rod screw lead angle), the right rod thread flank is moved to the left to reach a position indicated by a broken line, where the meshing engagement between the roller annular groove and the rod thread is held. The rotary-to-linear motion conversion occurs in this way.

The amount of motion M of the rod per rotation of the motor becomes M=2π· (radius of rod shaft)·tan (rod screw lead angle) with δ taken as 2π. It is understood that as is apparent from this equation, a speed-reduction ratio can be increased by reducing the rod screw lead angle. Mesh points correspond to the annular groove faces on the roller side and the thread flanks on the rod side. Meshing engagement is made between faces small in curvature. Thus, since contact occurs in a wide range due to elastic deformation at the meshing engagement, the maximum value (hertz stress) of produced stress is suppressed. Therefore, the rotary-to-linear motion conversion mechanism according to the present embodiment brings about advantageous effects in that the load applied per meshing engagement increases and large thrust can be produced for its compact.

What is claimed is:

1. A mechanism for converting rotary motion into linear motion, comprising:
    a rod having a thread at an outer peripheral surface thereof;
    a holder member provided on the outer peripheral surface of the rod, and provided so as to be rotatable relative to the rod and axially movable relative thereto; and
    rollers supported rotatably by the holder member and having annular grooves brought into meshing engagement with the thread at outer peripheral surfaces thereof, each of said rollers torsionally disposed at an axial angle that is the same as a lead angle of the thread with respect to a central axis of the rod,
    wherein each of the rollers comprises a roller annular section, having a through hole at its central axis portion and the annular grooves at its outer peripheral surface, and a roller shaft,
    wherein the roller shaft is disposed in the through hole of the roller annular section so as to be rotatable relative to the roller annular section,
    wherein the roller shaft has a structure in which both ends thereof are secured to the holder member,
    wherein a holder insertion hole having a diameter greater than that of the roller shaft is provided at one end of the holder member,
    wherein one end of the roller shaft is secured to the one end of the holder member by a roller mounting member which fills a gap between an inner peripheral surface of the holder insertion hole and an outer peripheral surface of the one end of the roller shaft,
    wherein the holder insertion hole is formed as a hole extending through one end of the holder member, and
    wherein the roller mounting member is formed as a structure capable of being inserted from the non-roller annular section side of the through hole.

2. The mechanism for converting rotary motion into linear motion according to claim 1, wherein one end side of the roller shaft is shaped in the form of a taper.

3. The mechanism for converting rotary motion into linear motion according to claim 2, wherein when the axial angle is θ, the diameter of the roller shaft at its end face is D, the depth of insertion into the holder member at the central axis of the roller shaft is x, and the angle formed with the central axis of the taper provided on one end side of the roller shaft is α, the axial angle θ is larger than the angle α formed with the central axis of the taper provided on one end side of the roller shaft, and the diameter of the holder insertion hole is set greater than H=D+(x−D/2×sin(θ))×sin(θ)+(x+D/2×sin(θ))×sin(θ)/cos(θ+α).

4. The mechanism for converting rotary motion into linear motion according to claim 1, wherein when the axial angle is θ, the diameter of the roller shaft at its end face is D, the depth of insertion into the holder member at the central axis of the roller shaft is x, and the angle formed with the central axis of the taper provided on one end side of the roller shaft is α, the axial angle θ is smaller than the angle α formed with the central axis of the taper provided on one end side of the roller shaft, and the diameter of the holder insertion hole is set greater than H=D+(x−D/2×sin(θ))×sin(θ)/cos(α−θ)+(x+D/2×sin(θ))×sin(θ)/cos(θ+α).

5. The mechanism for converting rotary motion into linear motion according to claim 1, wherein the roller mounting member and the roller shaft are connected to each other by a bolt inserted from a non-roller annular section side of a hole extending through one end of the holder member.

* * * * *